United States Patent
Demircioglu

(10) Patent No.: US 8,990,818 B2
(45) Date of Patent: Mar. 24, 2015

(54) MULTIPLE TOP LEVEL USER INTERFACE DISPLAYS

(75) Inventor: Ali Deniz Demircioglu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 96 days.

(21) Appl. No.: 13/606,017

(22) Filed: Sep. 7, 2012

(65) Prior Publication Data

US 2013/0326520 A1 Dec. 5, 2013

Related U.S. Application Data

(60) Provisional application No. 61/654,127, filed on Jun. 1, 2012.

(51) Int. Cl.
G06F 9/46 (2006.01)
G06F 9/44 (2006.01)
G06F 9/54 (2006.01)

(52) U.S. Cl.
CPC .............. *G06F 9/4443* (2013.01); *G06F 9/541* (2013.01)
USPC .......................................... 718/100; 715/700

(58) Field of Classification Search
None
See application file for complete search history.

(56) References Cited

U.S. PATENT DOCUMENTS

| 7,426,735 B2 | 9/2008 | Bliss et al. |
| 2006/0218500 A1 | 9/2006 | Sauve et al. |
| 2008/0168125 A1 | 7/2008 | Chen et al. |
| 2009/0319933 A1 | 12/2009 | Zaika et al. |
| 2010/0257229 A1* | 10/2010 | Bolohan et al. ............... 709/203 |
| 2011/0126210 A1 | 5/2011 | Rivard et al. |
| 2011/0258594 A1 | 10/2011 | Syme et al. |
| 2011/0320521 A1* | 12/2011 | Steiner .......................... 709/203 |
| 2012/0072910 A1* | 3/2012 | Martin et al. ..................... 718/1 |

FOREIGN PATENT DOCUMENTS

EP 2 400 725 A1 12/2011

OTHER PUBLICATIONS

"Minimize startup time" Retrieved at <<http://msdn.microsoft.com/en-us/library/windows/apps/hh994639.aspx>>, Retrieved Date: Jun. 11, 2012, pp. 4.

"MSDN News", Retrieved at <<http://mitaunmla.unm.edu/aggregator/sources/21>>, Retrieved Date: Jun. 8, 2012, pp. 47.

International Search Report and Written Opinion of the International Searching Authority in corresponding PCT application PCT/US2013/043800, mailed on Oct. 22, 2013.

* cited by examiner

*Primary Examiner* — Emerson Puente
*Assistant Examiner* — Dong Kim
(74) *Attorney, Agent, or Firm* — Steve Crocker; Jim Ross; Micky Minhas

(57) ABSTRACT

When a program invokes a synchronous user interface display, it is determined whether an asynchronous user interface (UI) display needs to be generated. If so, the user interface thread invoked by the synchronous program is blocked and the asynchronous UI display is generated and displayed so that it covers the synchronous display on the UI display screen. When the processing corresponding to the synchronous user interface display is complete, processing returns to the synchronous user interface display and the user interface thread invoked by the synchronous program is unblocked.

20 Claims, 15 Drawing Sheets

MULTIPLE TOP LEVEL USER INTERFACE DISPLAYS

The present application is based on and claims the benefit of U.S. provisional patent application Ser. No. 61/654,127, filed Jun. 1, 2012, the content of which is hereby incorporated by reference in its entirety.

BACKGROUND

Many computer programs generate user interface displays. The user interface displays generally display information on a display screen, for observation by a user. Some of the user interface displays also include user input mechanisms that allow the user to interact with mechanisms on the user interface display to provide inputs to the computer program. Currently, some programs generate user interface displays using a synchronous programming model, while others generate the user interface displays using an asynchronous programming model.

In a synchronous system, the program may generate a user interface (UI) display on a user interface programming thread. A user interface thread (or user interface programming thread) is a thread that can have a message queue and a message loop and that dispatches messages to windows. By way of example, one such user interface display is referred to as a modal dialog display. A modal dialog display is a user interface display that requires user interaction before processing can proceed. For instance, if the user desires to delete a file, a synchronous program may generate a dialog box which states "Do you want to delete this file?", and also display "yes" and "no" buttons for actuation by the user. In a synchronous system, processing will not continue until the user interacts with that modal dialog display by either clicking the "yes" button or the "no" button. Therefore, the program can be written in such a way that the programmer can assume that the user answered the question in the modal dialog box before the next line of program code is executed.

As another example, in a synchronous system, the synchronous program might generate a user interface display corresponding to a long-running operation. For instance, if the user has selected a large amount of text to be copied from one document and pasted to another, this operation can take several seconds. During that time, the synchronous program may inhibit other user inputs from taking place until the long-running operation has been completed. By way of example, the synchronous program can "gray out" the user interface display elements so that no user inputs are possible while the text is being copied from one document and pasted to the other document. Similarly, if the user is launching an application or booting up the system, itself, these operations can take several seconds, and might also be considered long-running operations. During those long-running operations, the system often inhibits other user inputs from taking place until the operation is complete.

This is not the case in an asynchronous system. Asynchronous systems often simply invoke a modal dialog box, or a long-running operation, in one line of code, asynchronously, so that the subsequent lines of code cannot assume that the program has received a response to the question in the modal dialog box or that the long-running operation is complete. The user interface thread is asynchronous and processing continues in the program code, regardless of whether the user has interacted with the modal dialog box or whether the operations corresponding to the UI are complete.

Asynchronous systems also operate to ensure that user interface display threads do not unnecessarily block user inputs. By way of example, if an asynchronous user interface display is generated, and it is blocking user inputs from being received by the program for a certain amount of time (such as five seconds, or ten seconds, or another threshold amount of time), then some asynchronous systems kills the user interface display thread that is blocking the user inputs (or even the entire application). The asynchronous system assumes that the user interface display thread is not responding appropriately and therefore it should be killed.

This can make it difficult to run a program written using a synchronous programming model, in a system that is generated using an asynchronous programming model. For instance, if a synchronous program is conducting a long-running operation that takes longer than five-ten seconds (by way of example), the asynchronous system might kill the application (or at least UI thread) responsible for the long-running operation. This can result in undesirable operation.

The discussion above is merely provided for general background information and is not intended to be used as an aid in determining the scope of the claimed subject matter.

SUMMARY

When a program invokes a synchronous user interface display, it is determined whether an asynchronous user interface (UI) display needs to be generated. If so, the user interface thread invoked by the synchronous program is blocked and the asynchronous UI display is generated and displayed so that it covers the synchronous display on the UI display screen. When the processing corresponding to the synchronous user interface display is complete, processing returns to the synchronous user interface display and the user interface thread invoked by the synchronous program is unblocked.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
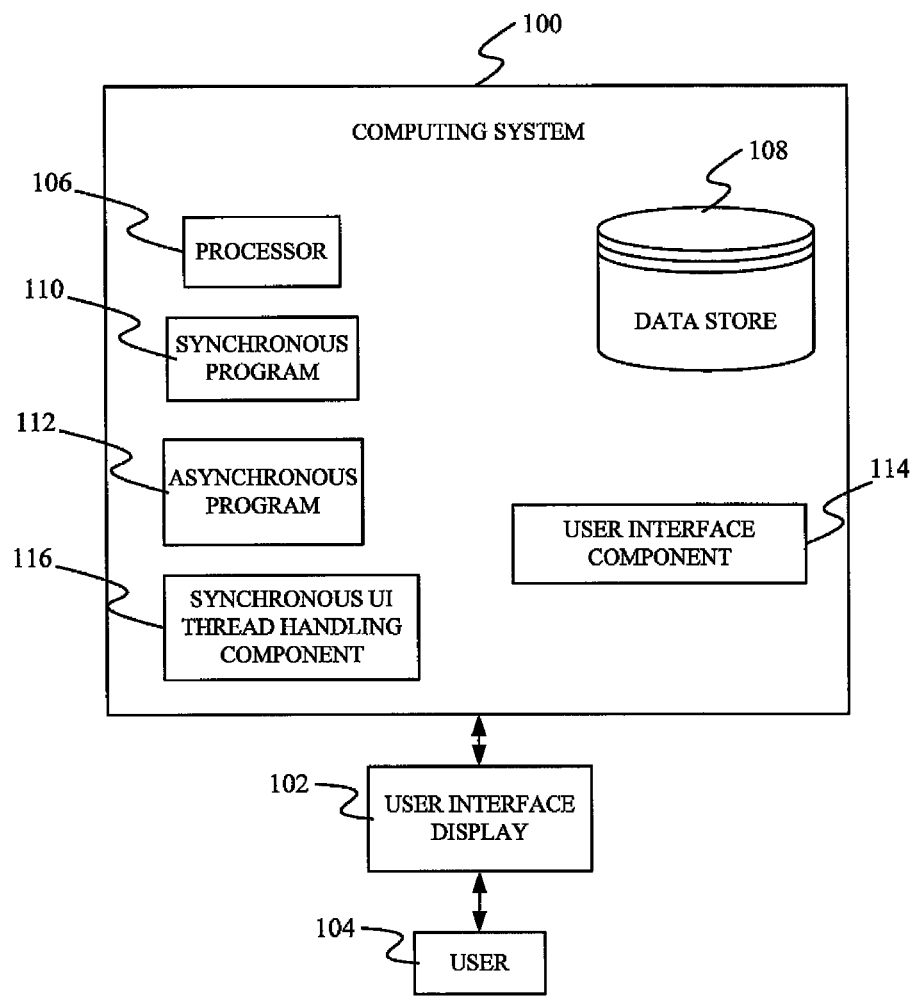
FIG. 1 is a block diagram of one illustrative computing system.

FIG. 1 is a block diagram of one illustrative computing system 100 that generates user interface displays 102 for display to a user 104. In the embodiment shown in FIG. 1, computing system 100 includes processor 106, data store 108, synchronous program 110, asynchronous program 112, user interface component 114 and synchronous UI thread handling component 116.

In one embodiment, processor 106 is a computer processor with associated memory and timing circuitry (not shown). Processor 106 is a functional part of system 100 and is activated by, and facilitates functionality of, other programs and components of system 100. Data store 108 illustratively stores data that can be used by synchronous program 110, asynchronous program 112, or other programs. Synchronous program 110 is illustratively a computer program or component that is authored using a synchronous programming model. Program 110 can be an application or other program. Similarly, asynchronous program 112 is illustratively a program authored using an asynchronous programming model. It can be an application or other program as well.

User interface component 114 illustratively generates user interface displays 102 for display to user 104. User interface displays 102 illustratively include user input mechanisms for receiving user inputs from user 104. The user input mechanisms can be any suitable user input mechanisms for receiving user inputs from a touch sensitive screen, from a keyboard, a point and click device (e.g., a mouse), a virtual keyboard or software keyboard, voice inputs, etc. In any case, user 104 illustratively interacts with system 100 through user interface displays 102.

Figure 2A:
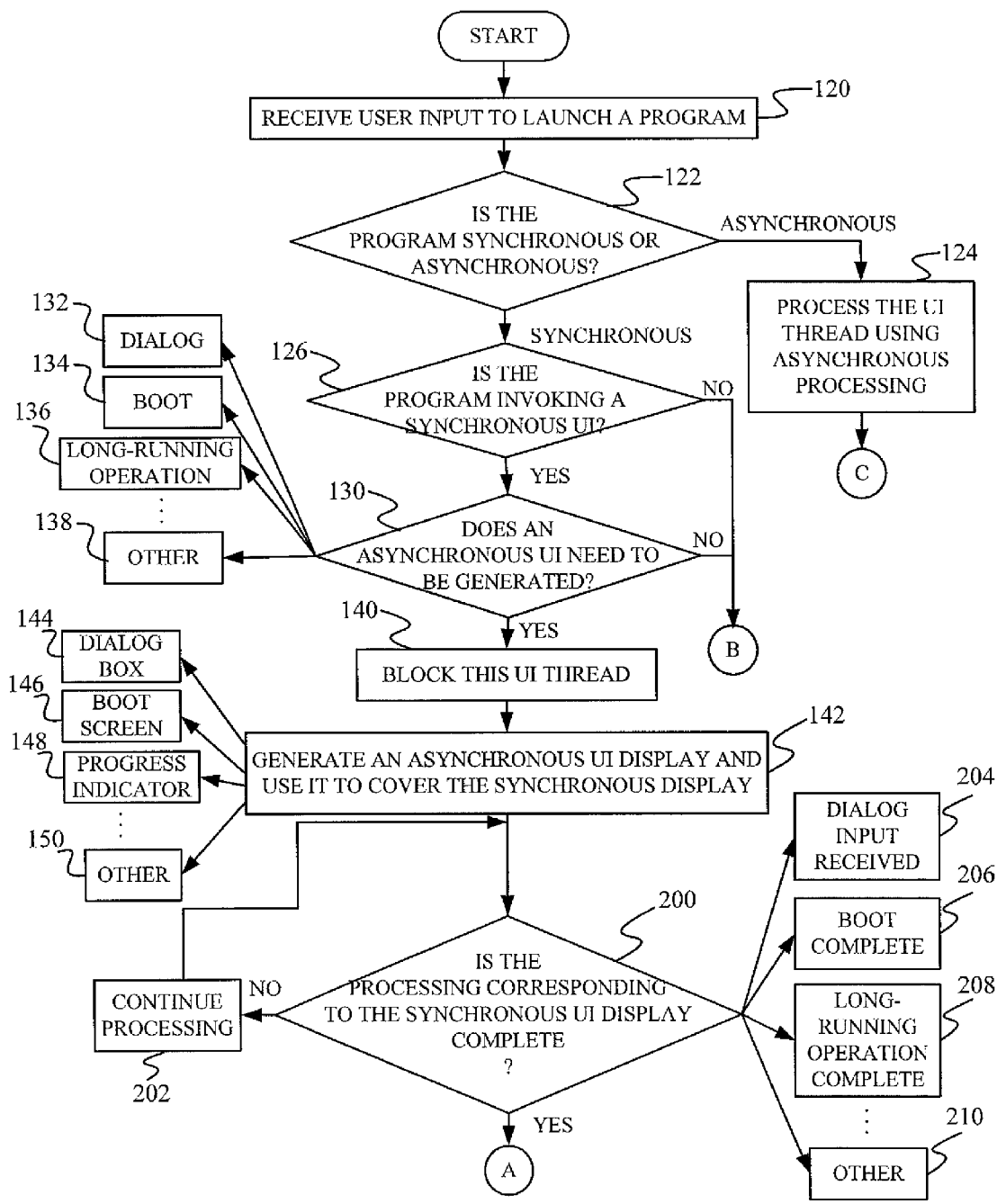
FIGS. 2A-2B show a flow diagram illustrating one embodiment of the operation of the system shown in FIG. 1 in processing a synchronous user interface thread.
Figure 2B:
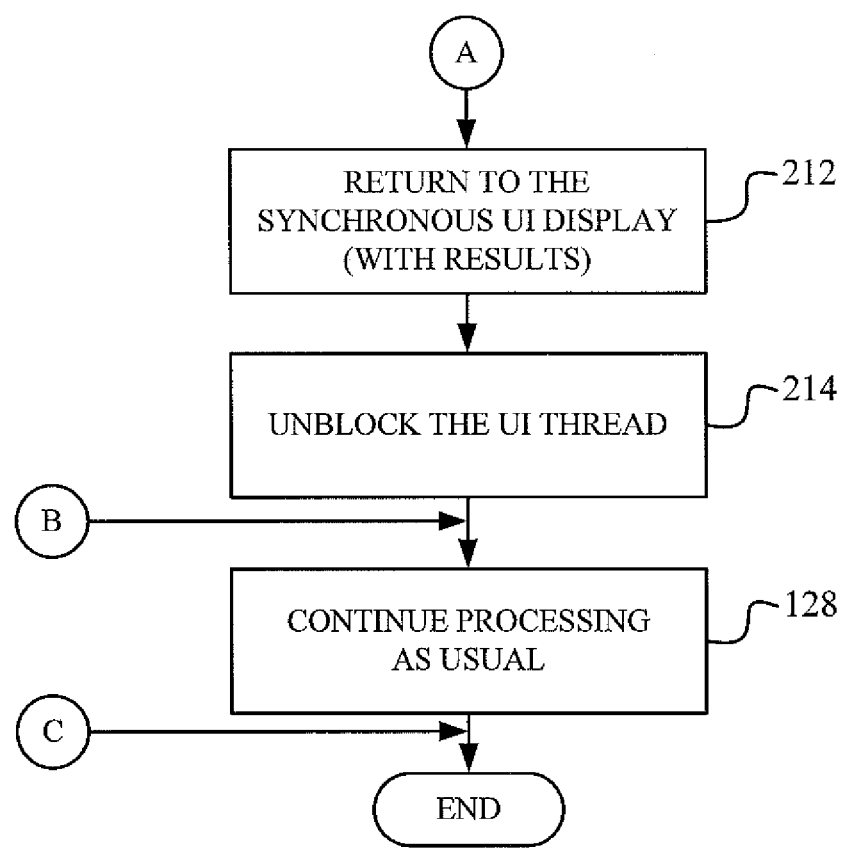

In one embodiment, computing system 100 can operate with both synchronous program 110 and asynchronous program 112 generating interface displays 102 through user interface component 114, without the risk of having a user interface (UI) display thread killed when it is generated by synchronous program 110. The synchronous UI thread is handled by component 116 so it is not killed by the asynchronous system. FIGS. 2A and 2B show a flow diagram illustrating one embodiment of the operation of system 100 in doing this.

However, before describing the operation of system 100 in processing user interface threads in more detail, a brief description will be provided for the sake of overview only. It is first assumed that system 100 illustratively operates according to an asynchronous programming model. Therefore, under normal operation, it expects to process asynchronous user interface threads. However, it may be that a synchronous program (such as program 110) is also operating within system 100. In that case, synchronous program 110 is authored using a synchronous programming model in which user interface threads are processed in a synchronous way. That is, certain user interface threads will block further execution of code in program 110 until processing corresponding to the user interface thread is completed.

By way of example, it may be that program 110 generates a modal dialog box with which the user 104 is to interact, through the user interface display 102 that comprises the modal dialog box, prior to any further processing being conducted. Further, where program 110 is a boot program, it may be that no user inputs will be received during the boot process. In addition, where program 110 is executing a long-running operation, it may be that it will not accept any user inputs until execution of the long-running operation is completed. In any case, when system 110 operates according to an asynchronous programming model, all of these user interface threads may be prematurely killed by system 100 before their corresponding processing has been completed.

Thus, when synchronous program 100 invokes a user interface thread, component 116 determines whether the program invoking the user interface thread is synchronous or asynchronous. If it is synchronous, then system 100 determines whether the user interface thread might be prematurely killed. If so, component 116, using component 114, generates an asynchronous user interface display and covers the synchronous user interface display generated by program 110. Component 116 then blocks the code in program 110 from further execution until the processing corresponding to the synchronous user interface thread has been completed. Then, component 116 removes the asynchronous user interface display, uncovering the synchronous user interface display generated by program 110, and component 116 unblocks program 110 so that it can continue processing. In this way, since the asynchronous user interface display is generated and covers the synchronous user interface display, system 100 will not kill the synchronous user interface display, since it is no longer precluding user inputs, because the asynchronous user interface display is covering it. Thus the processing corresponding to the synchronous user interface display has been completed, and the asynchronous user interface display is removed. Processing returns to the synchronous user interface display, and program 110 is unblocked so that it can continue its processing.

FIGS. 2A and 2B will now be discussed in conjunction with one another, and collectively referred to as FIG. 2. System 100 first receives a user input from user 104, to launch a program. This is indicated by block 120 in FIG. 2. System 100 (and specifically component 116) then determines whether the program is a synchronous program 110 or an asynchronous program 112. This is indicated by block 122 in FIG. 2A. If it is an asynchronous program 112, then there is no need to be concerned about whether the system will kill a user interface thread, in an asynchronous way, because asynchronous program 112 is authored using an asynchronous programming model, and its operation will not be negatively affected. Therefore, system 100 simply processes all user interface threads using asynchronous processing. This is indicated by block 124 in FIG. 2, and processing of the user interface threads is completed.

However, if, at block 122, it is determined that the user is using a synchronous program 110, then component 116 determines whether the program 110 is invoking a synchronous user interface thread. This is indicated by block 126 in FIG. 2. If not, then program 110 simply continues processing as usual, as indicated by block 128 in FIG. 2.

However, if, at block 126, it is determined that program 110 is invoking a synchronous user interface thread, then component 116 determines whether an asynchronous user interface needs to be generated. This is indicated by block 130 in FIG. 2.

In order to determine whether an asynchronous user interface display needs to be generated, a variety of different things can be considered. In one embodiment, every time a user interface thread is invoked by a program, it is submitted to processing by synchronous UI thread handling component 116. Component 116 can then determine whether the asynchronous UI display needs to be generated in a number of different ways. For instance, if the UI thread corresponds to a modal dialog box, then component 116 determines that the asynchronous user interface display does need to be generated. Similarly, if the program invoking the user interface thread is a boot program, then component 116 will determine that the asynchronous user interface display needs to be generated as well. In addition, if the operation corresponding to the synchronous user interface is a long-running operation, the asynchronous user interface display can be generated under those circumstances as well. The dialog is indicated by block 132 in FIG. 2, while the boot program is indicated by block 134 and the long running operation is indicated by block 136. Of course the asynchronous user interface display can be generated when the user interface invoked is another user interface as well. This is indicated by block 138.

If component 116 determines that the asynchronous user interface display does not need to be generated, then the program code is simply processed as usual, at block 128. However, if the asynchronous user interface display does need to be generated, then component 116 blocks the UI thread in program 110, so that no further code can be executed until processing corresponding to the synchronous user interface thread has been completed. This is indicated by block 140 in FIG. 2. Blocking the UI thread can be done in a variety of different ways. In one embodiment, component 116 calls an application programming interface (API) that can be used to block the processing of the UI thread. Of course, the block can be performed in other ways as well.

Component 116 then uses user interface component 114 to generate the asynchronous user interface display and uses that display to cover the synchronous user interface display on user interface display 102. This is indicated by block 142 in FIG. 2. For instance, where the synchronous display is a modal dialog box, component 116 generates an asynchronous modal dialog box and covers the synchronous modal dialog box. The asynchronous user interface for the modal dialog box is indicated by block 144 in FIG. 2.

Where the synchronous user interface display is a screen corresponding to a boot operation, an asynchronous boot screen is generated as indicated by block 146 in FIG. 2. Where the synchronous user interface display corresponds to a long-running operation, an asynchronous progress indicator is displayed as indicated by block 148. Of course other asynchronous displays can be used as well and this is indicated by block 150.

FIGS. 3A-3F show illustrative asynchronous user interface displays that can be generated and used to cover the synchronous user interface displays. In one embodiment, the asynchronous user interface displays are whole-screen user interface displays that cover the entire user interface display screen on which the synchronous user interface display is shown. Of course, other sizes of asynchronous user interface display screens can be generated as well.

Figure 3A:
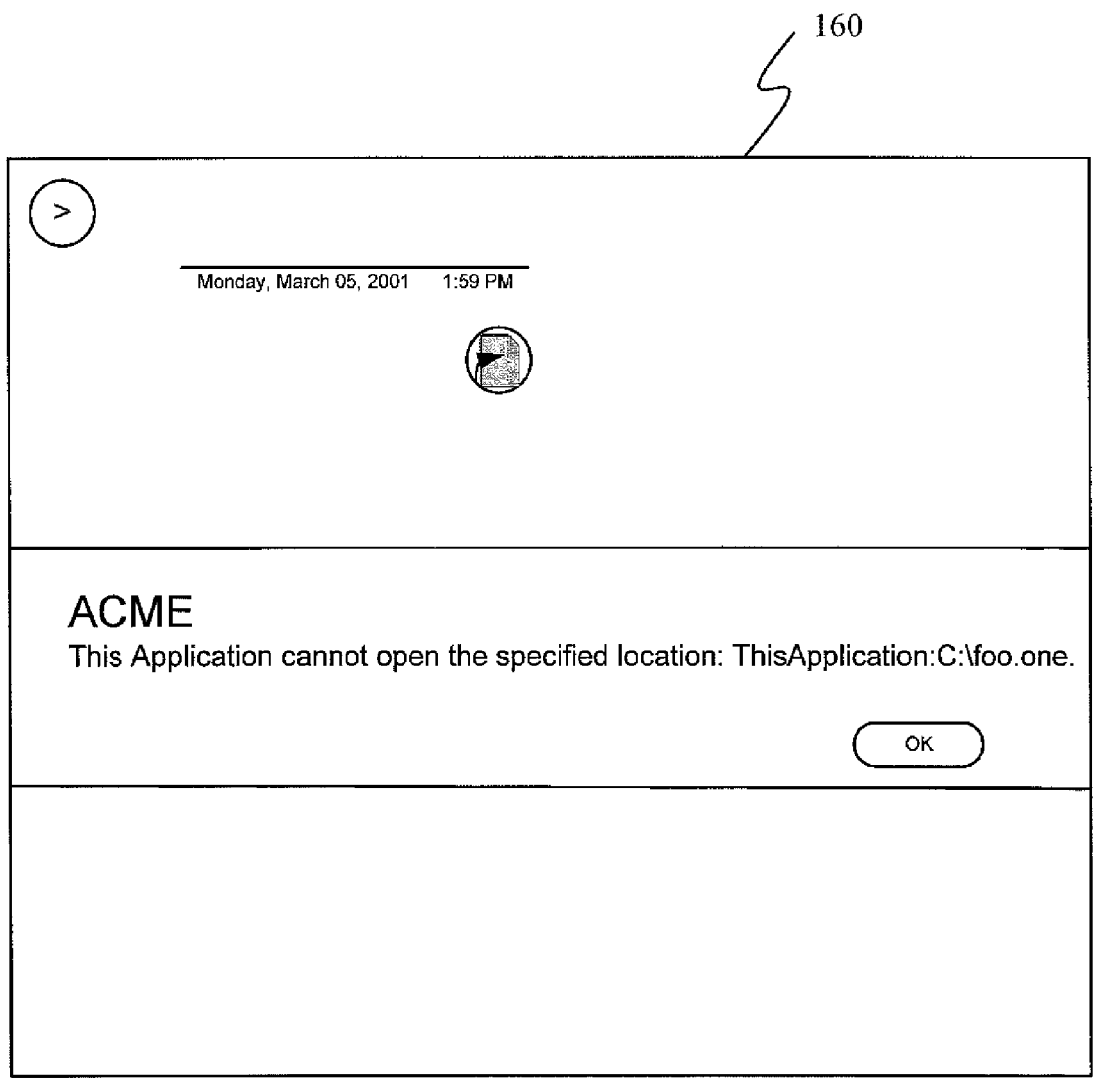
FIGS. 3A-3F show illustrative asynchronous user interface displays.

By way of example, FIG. 3A shows a user interface display screen 160 that is an asynchronous modal dialog box. In one embodiment, where synchronous program 110 generates a synchronous modal dialog box, asynchronous modal dialog box 160 is generated and displayed over the top of the synchronous modal dialog box. Once the user interacts with the asynchronous modal dialog box 160, processing returns to program 110 and the synchronous modal dialog box generated by program 110, with the result of the user interaction with asynchronous modal dialog box 160.

Figure 3B:
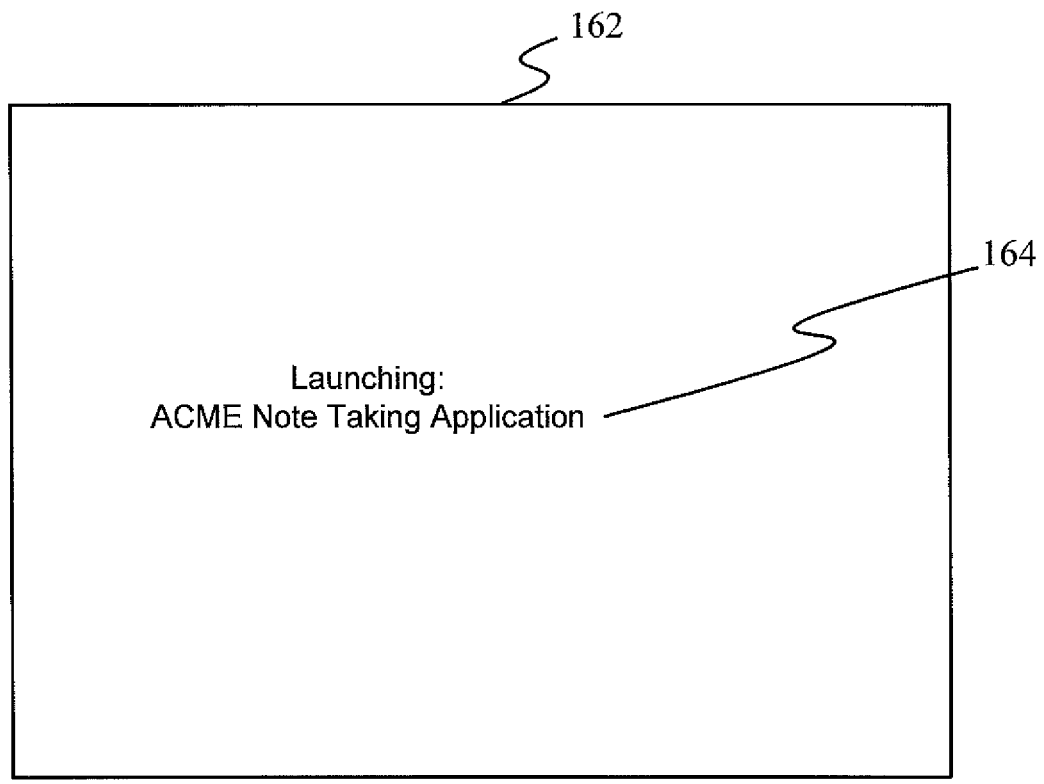

FIG. 3B is one illustrative embodiment of asynchronous boot display screen 162. Boot display screen 162 illustratively includes a program name indicator or other textual or graphical indicator 164 that shows the application or program or system that is booting or launching. Therefore, when program 110 is a boot program, and the user interface thread invoked by program 110 corresponds to a booting operation, component 116 illustratively generates asynchronous boot screen 162 and displays it over the top of the synchronous boot display screen generated by program 110.

Figure 3C:
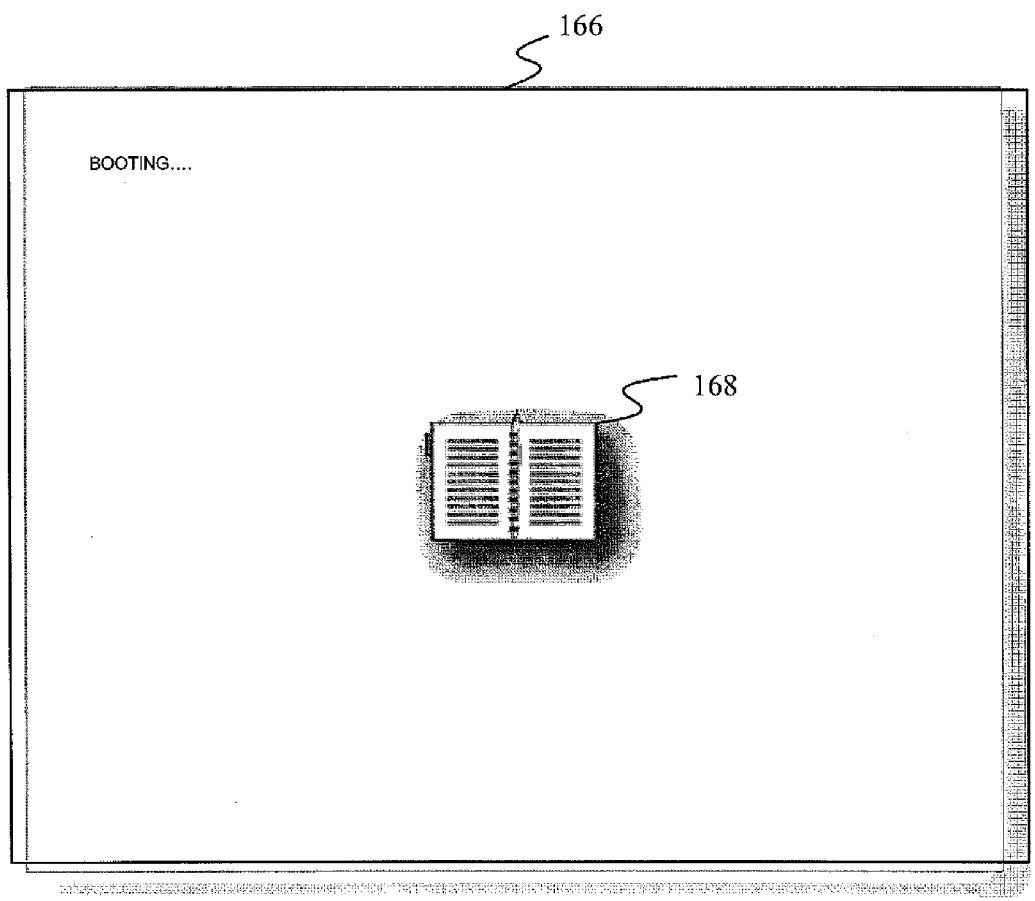

FIG. 3C is another embodiment of a boot display screen 166. Instead of a textual portion 164, boot display screen 166 has a graphical or iconic portion 168 that displays a graphical image. However, its operation is the same as boot display screen 162 shown in FIG. 3B.

Figure 3D:
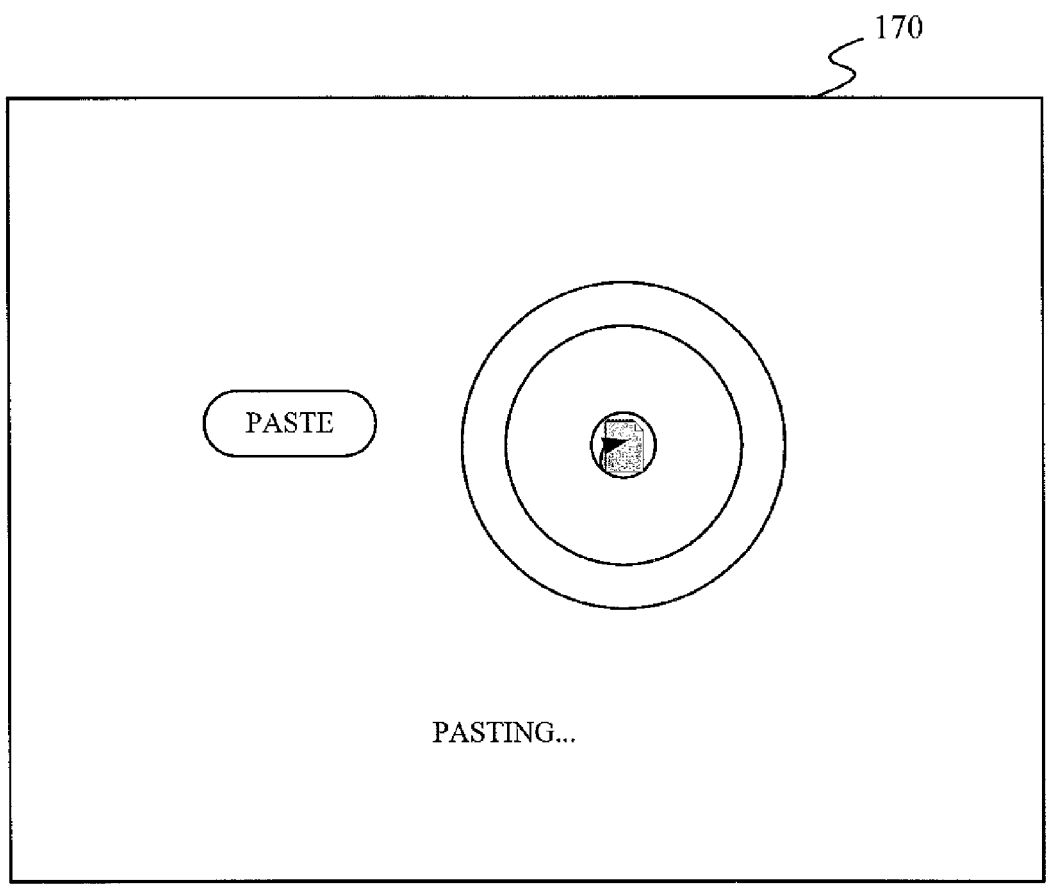
Figure 3E:
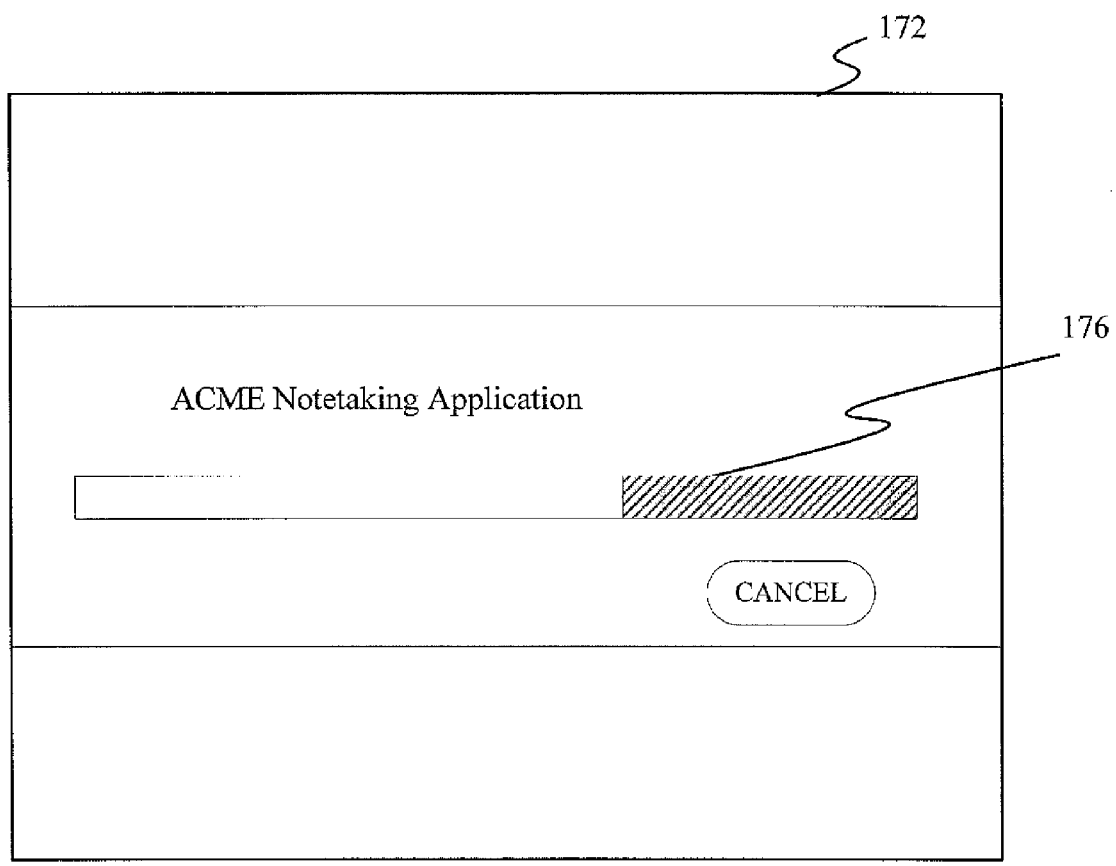
Figure 3F:
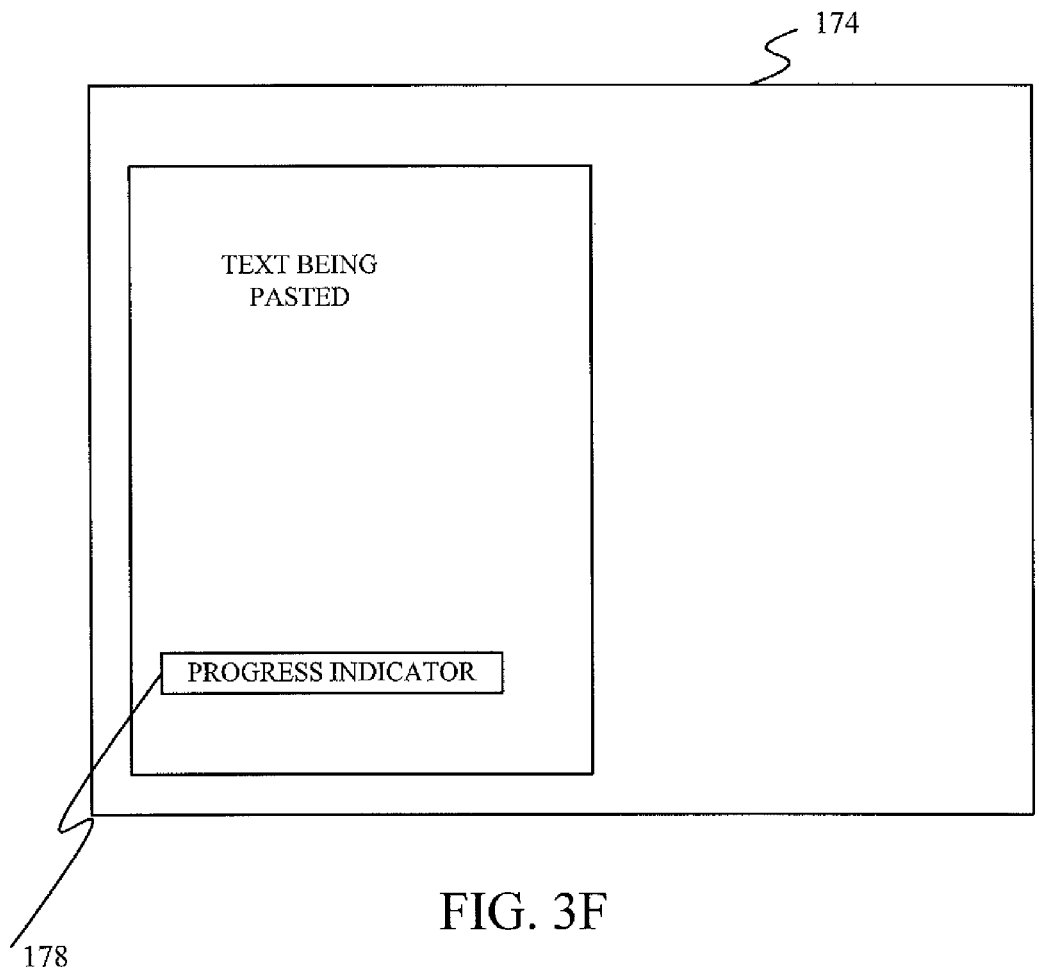

FIGS. 3D, 3E and 3F show various embodiments of progress displays 170, 172 and 174. In FIG. 3D, progress display 170 shows a radial progress indicator that indicates progress in performing a long-running operation. This asynchronous user interface display is displayed over the top of a synchronous display generated by program 110, that corresponds to a long-running operation.

FIG. 3E shows that progress display 172 includes a status bar 176 that shows the status of a long-running operation. Progress display 174 shown in FIG. 3F shows yet another progress display screen with a progress indicator 178 that shows the progress of one or more long-running operations corresponding to the synchronous user interface thread invoked by program 110.

Once the asynchronous user interface display is generated and displayed over the top of the synchronous user interface display, component 116 simply monitors the processing corresponding to the synchronous user interface display to determine when it is complete. This is indicated by blocks 200 and 202 in FIG. 2. For example, where the synchronous user interface display is a modal dialog display, component 116 monitors when the appropriate user interaction has been received. This is indicated by block 204. Where the synchronous user interface display corresponds to a boot operation, component 116 determines when the boot operation is complete. This is indicated by block 206. When the synchronous user interface display corresponds to a long-running operation, component 116 determines when the long-running operation is complete. This is indicated by block 208. Of course, component 116 can monitor other operations as well, and this is indicated by block 210.

Once the processing that corresponds to the synchronous user interface display has been completed, component 116 returns to the synchronous user interface display, along with the result (if any) of the processing, and unblocks the user interface thread in program 110, so that processing in program 110 can continue. This is indicated by blocks 212 and 214 in FIG. 2B. Unblocking the UI thread can be done by calling a suitable API or in any other desired way. System 100 then continues to process the code in program 110 as usual. This, again, is indicated by block 128.

It can thus be seen that even synchronous UI threads can be processed in an asynchronous computing environment. The synchronous program 110 synchronously waits on asynchronous operations. This also makes it easier to transition single threaded conventional applications into multi-threaded environments.

Figure 4:
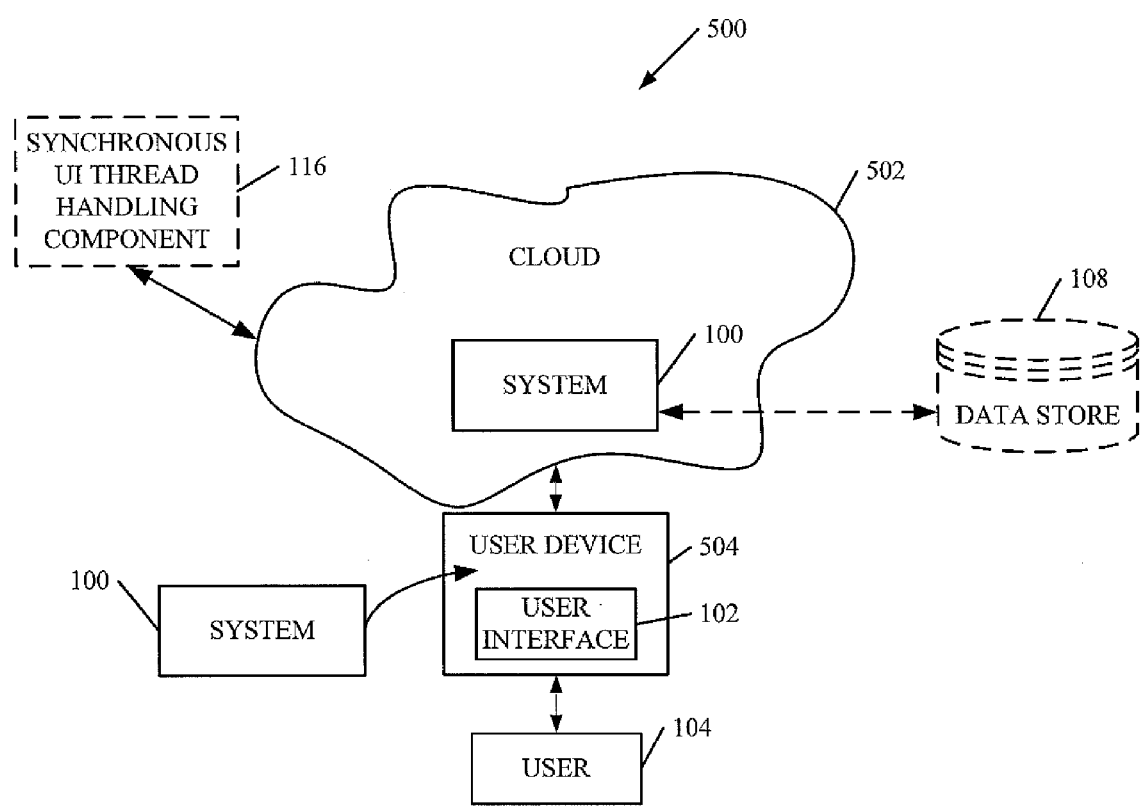
FIG. 4 shows a block diagram of illustrative cloud computing architectures.

FIG. 4 is a block diagram of system 100, shown in various architectures, including cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of system 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

The embodiment shown in FIG. 4, specifically shows that system 100 is located in cloud 502 (which can be public, private, or a combination where portions are public while others are private). Therefore, user 104 uses a user device 504 to access those systems through cloud 502.

FIG. 4 also depicts another embodiment of a cloud architecture. FIG. 4 shows that it is also contemplated that some elements of system 100 are disposed in cloud 502 while others are not. By way of example, data store 108 can be disposed outside of cloud 502, and accessed through cloud 502. In another embodiment, some or all of the components of system 100 are also outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. FIG. 4 further shows that some or all of the portions of system 100 can be located on device 504. All of these architectures are contemplated herein.

It will also be noted that system 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
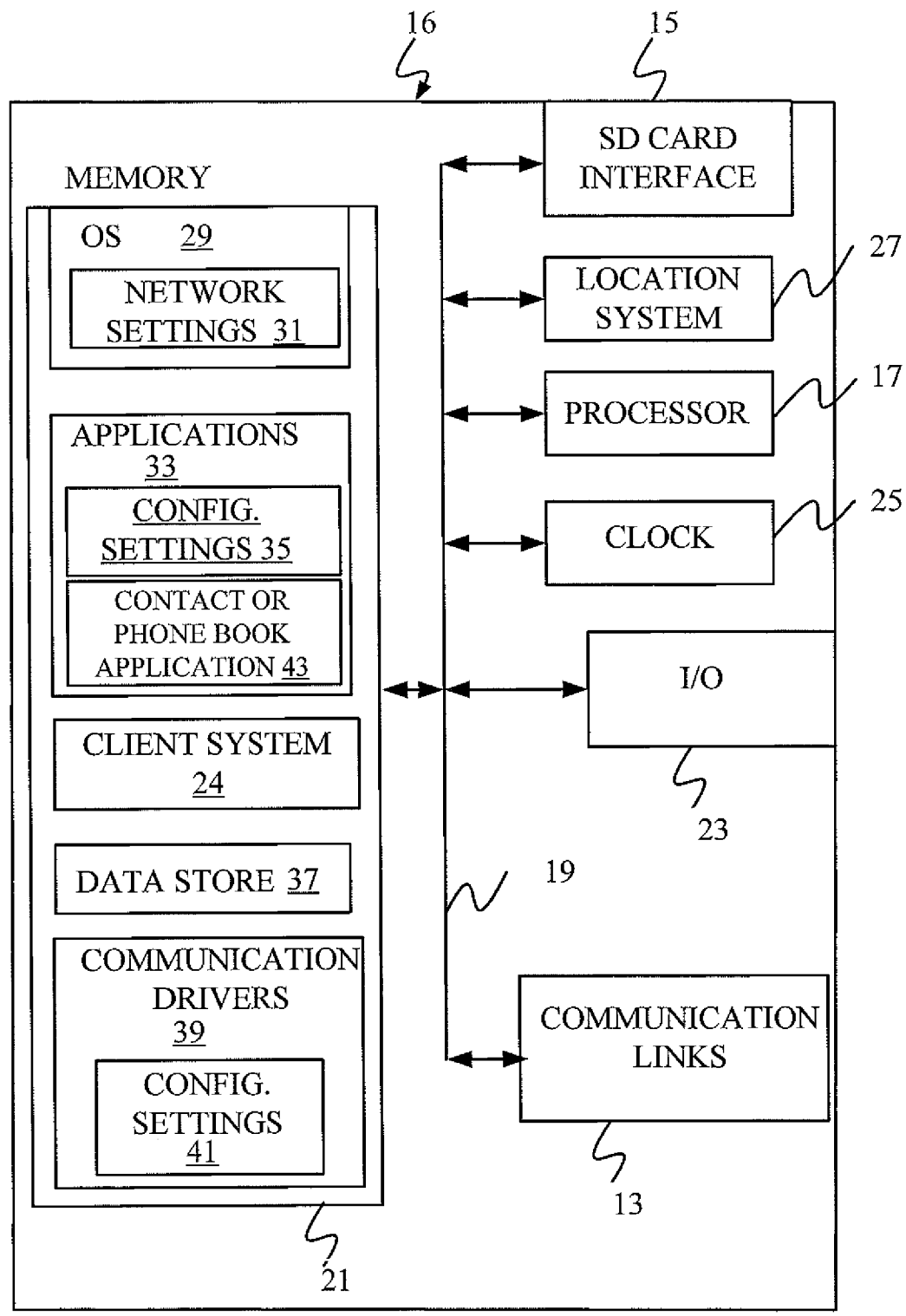
FIGS. 5-8 illustrate various mobile devices.
Figure 6:
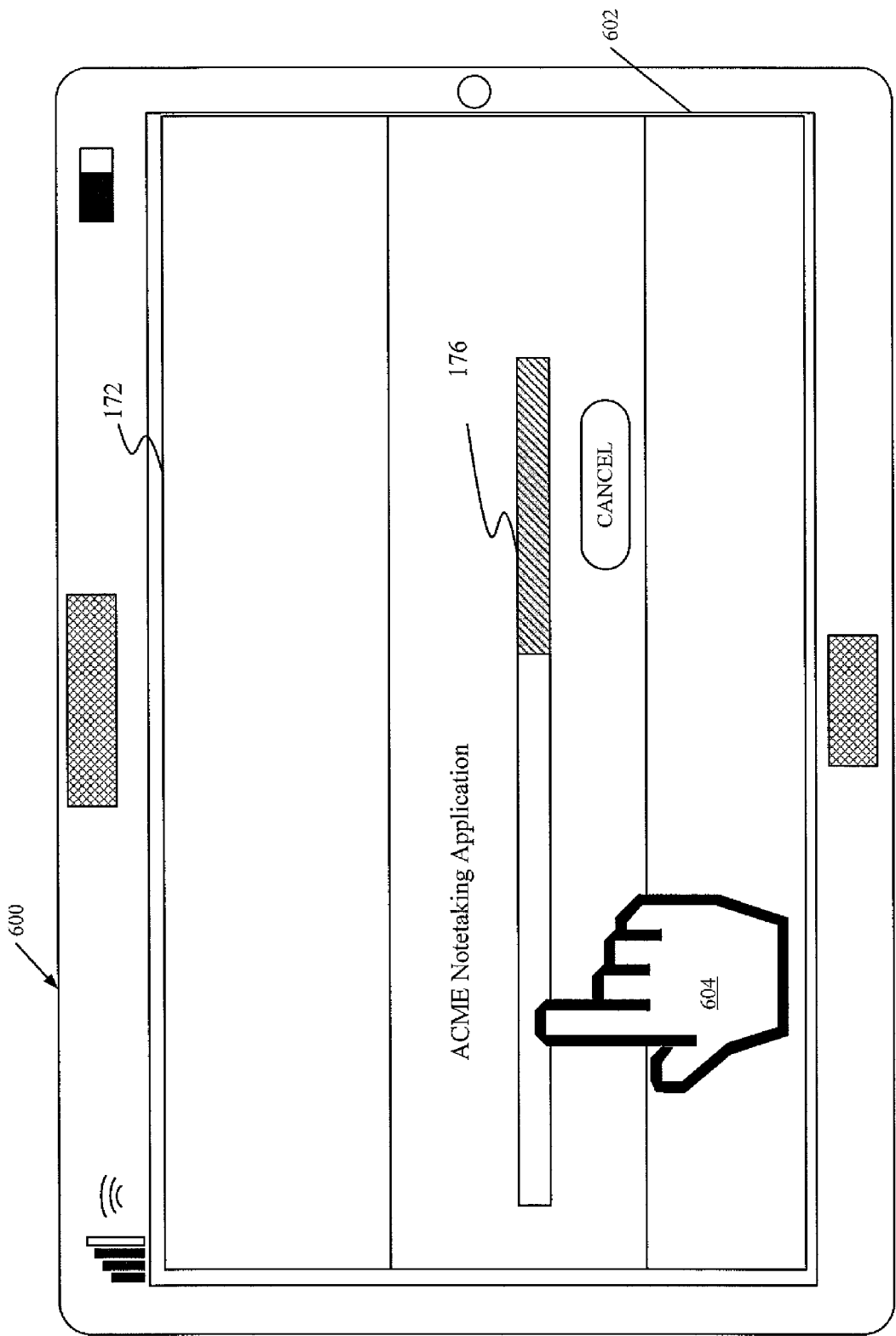
Figure 7:
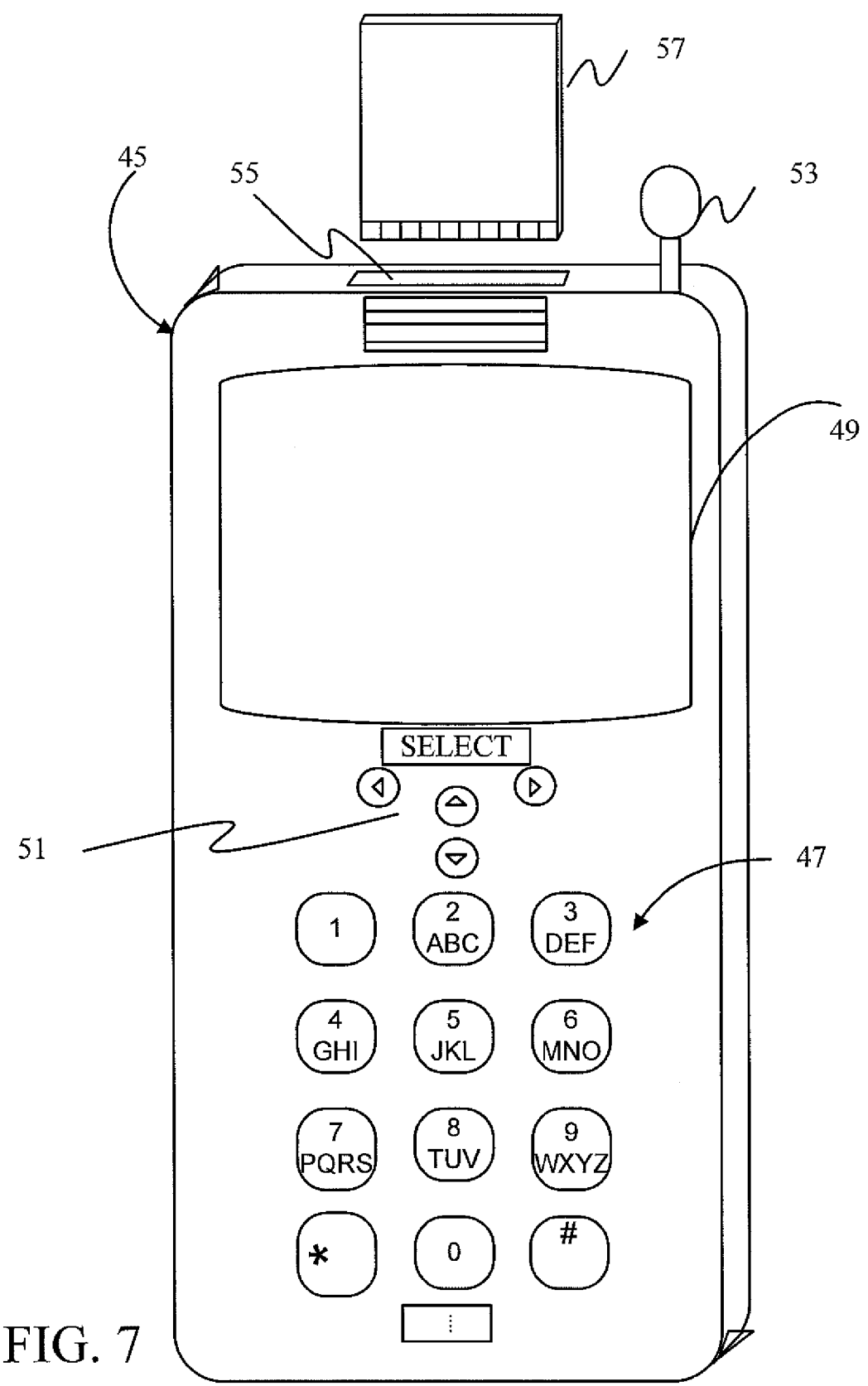
Figure 8:
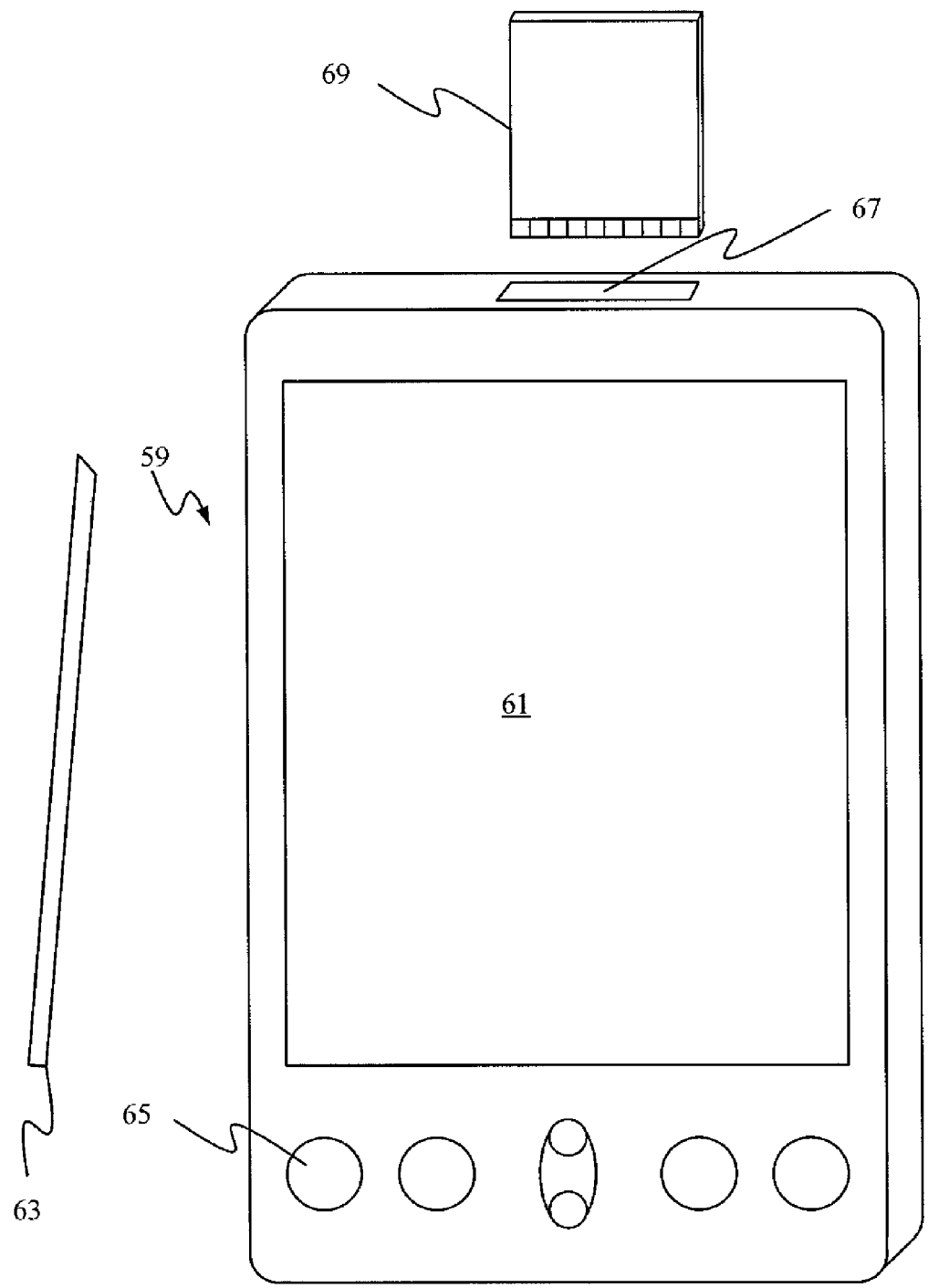

FIG. 5 is a simplified block diagram of one illustrative embodiment of a handheld or mobile computing device that can be used as a user's or client's hand held device 16, in which the present system (or parts of it) can be deployed. FIGS. 6-8 (discussed below) are examples of handheld or mobile devices.

FIG. 5 provides a general block diagram of the components of a client device 16 that can run components of system 100 or that interacts with system 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems (like system 100) are received on a removable Secure Digital (SD) card that is connected to a SD card interface 15. SD card interface 15 and communication links 13 communicate with a processor 17 (which can also embody processors 106 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/0 components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. System 100 or the items in data store 108, for example, can reside in memory 21. Similarly, device 16 can have a client business system 24 which can run various business applications or embody parts or all of system 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 6 shows one embodiment in which device 16 is a tablet computer 600. In FIG. 6, computer 600 is shown with display screen 602. Screen 602 can be a touch screen (so touch gestures from a user's finger 604 can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIGS. 7 and 8 provide additional examples of devices 16 that can be used, although others can be used as well. In FIG. 7, a smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1Xrtt, and Short Message Service (SMS) signals. In some embodiments, phone 45 also includes a Secure Digital (SD) card slot 55 that accepts a SD card 57.

The mobile device of FIG. 8 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Note that other forms of the devices 16 are possible.

Figure 9:
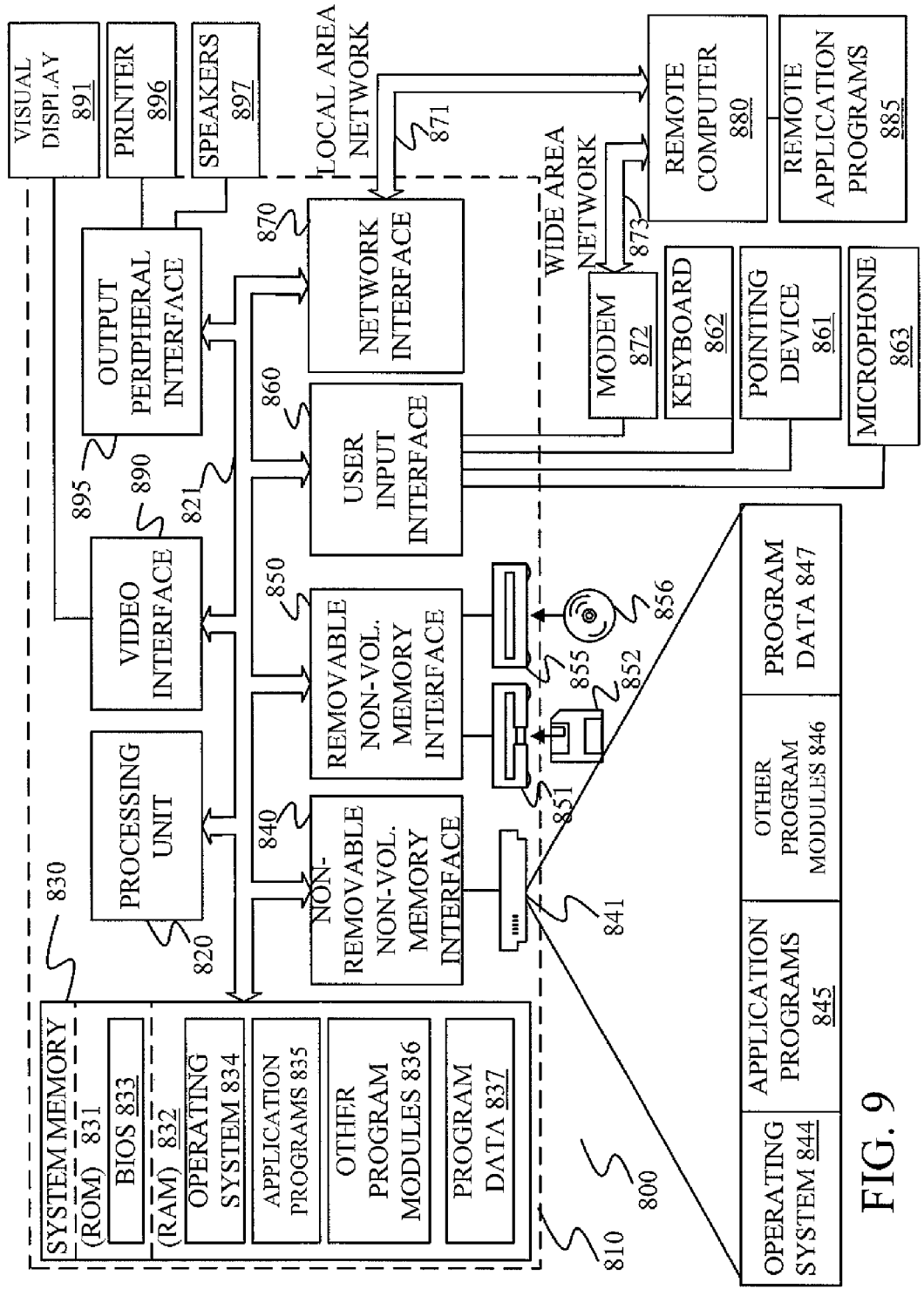
FIG. 9 is a block diagram of one illustrative computing environment.

FIG. 9 is one embodiment of a computing environment in which system 100 (for example) can be deployed. With reference to FIG. 9, an exemplary system for implementing some embodiments includes a general-purpose computing device in the form of a computer 810. Components of computer 810 may include, but are not limited to, a processing unit 820 (which can comprise processor 106), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. These can be the programs and components shown in FIG. 1 or others.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on remote computer 880. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method of processing a synchronous user interface thread by a synchronous program, comprising:
    detecting that the synchronous program is invoking a synchronous user interface display;
    detecting that an asynchronous user interface is to be displayed;
    blocking the synchronous user interface thread, using a synchronous user interface thread handling component, based on the asynchronous user interface thread;
    displaying the asynchronous user interface display over the synchronous user interface display while blocking the synchronous user interface thread;
    detecting completion of processing, by the synchronous program, corresponding to the synchronous user interface display;
    based on detecting completion of processing corresponding to the synchronous user interface display, removing display of the asynchronous user interface display; and unblocking the synchronous user interface thread.

2. The computer-implemented method of claim 1 and further comprising:
    prior to detecting that the synchronous program is invoking a synchronous user interface display, detecting that a program that generated the user interface thread is the synchronous program.

3. The computer-implemented method of claim 2 and further comprising:
    after detecting that the synchronous program is invoking a synchronous user interface display, detecting that an asynchronous user interface display is to be displayed over the synchronous user interface display.

4. The computer-implemented method of claim 3 wherein detecting that an asynchronous user interface display is to be displayed over the synchronous user interface display, comprises:
    detecting a type of processing corresponding to the synchronous user interface display; and
    generating the asynchronous user interface display based on the type of processing detected.

5. The computer-implemented method of claim 4 wherein generating the asynchronous user interface display based on the type of processing detected comprises:
    when the type of processing comprises processing for a modal dialog box, generating an asynchronous modal dialog user interface display as the asynchronous user interlace display.

6. The computer-implemented method of claim 5 wherein generating the asynchronous user interface display based on the type of processing detected comprises:
    when the type of processing comprises processing for a boot operation, generating an asynchronous boot user interface display, indicating that the boot operation is being performed, as the asynchronous user interface display.

7. The computer-implemented method of claim 5 wherein generating the asynchronous user interface display based on the type of processing detected comprises:
    when the type of processing comprises processing for a long-running operation that takes more than two seconds to complete, generating an asynchronous progress user interface display, indicating progress in performing the long-running operation, as the asynchronous user interface display.

8. The computer-implemented method of claim 4 wherein the synchronous user interface display is requesting an input value, and wherein displaying the asynchronous user interface display comprises:
    displaying the asynchronous user interface display to request the input value; and
    receiving the input value through the asynchronous user interface display;
    wherein removing display of the asynchronous user interface display comprises returning to the synchronous user interface display with the input value received through the asynchronous user interface display.

9. The computer-implemented method of claim 1, wherein the synchronous user interface thread is blocked prior to displaying the asynchronous user interface display over the synchronous user interface display.

10. A computing system, comprising:
    a synchronous user interface thread handling component detecting that a synchronous user interface thread by a synchronous program is invoking a synchronous user interface display, wherein the synchronous user interface thread handling component detects that an asynchronous user interface display is to be displayed, and blocks the synchronous user interface thread based on the detected asynchronous user interface display, and wherein the synchronous user interface thread handling component displays the asynchronous user interface display on top of the synchronous user interface display until the synchronous program has completed processing for the synchronous user interface display, and wherein the synchronous user interface thread handling component unblocks the synchronous user interface thread; and a computer processor, being a functional part of the system and activated by the synchronous user interface thread handling component to facilitate detecting the invocation of the synchronous user interface display and displaying the asynchronous user interface display on top of the synchronous user interface display.

11. The computer system of claim 10 wherein the synchronous user interface thread handling component blocks the synchronous user interface thread invoking the synchronous user interface display, until processing corresponding to the synchronous user interface display is completed.

12. The computing system of claim 11 wherein the synchronous user interface thread handling component removes display of the asynchronous user interface display and returns to the synchronous user interface display.

13. The computing system of claim 12 wherein, when the synchronous user interface thread handling component returns to the synchronous user interface display, it unblocks the synchronous user interface thread.

14. The computing system of claim 13 wherein the synchronous user interface display is requesting a user input value and wherein the synchronous user interface thread handling component receives a user input value through the asynchronous user interface display and returns to the synchronous user interface display with the user input value received through the asynchronous user interface display.

15. The computing system of claim 13 wherein the synchronous user interface thread handling component detects a type of operation corresponds to the synchronous user interface being invoked and determines which asynchronous user interface display to display on top of the synchronous user interface display based on the type of operation.

16. The computing system of claim 15 wherein the synchronous user interface thread handling component detects that the type of operation is a boot operation and displays an asynchronous boot user interface display.

17. The computing system of claim 15 wherein the synchronous user interface thread handling component detects that the type of operation is a modal dialog operation and displays an asynchronous modal dialog user interface display.

18. The computing system claim 15 wherein the synchronous user interface thread handling component detects that the type of operation is a long-running operation, that takes more than two seconds to complete, and displays an asynchronous progress user interface display showing progress of the long-running operation.

19. A hardware computer readable storage medium storing computer readable instructions which, when executed by a computer, cause the computer to perform a method, comprising:

detecting that a program that generated a user interface thread is a synchronous program;

detecting that the synchronous program is invoking a synchronous user interface display;

detecting that an asynchronous user interface display is to be displayed over the synchronous user interface display;

blocking the synchronous user interface thread by a synchronous user interface thread handling component in response to detecting that the asynchronous user interface display is to be displayed over the synchronous user interface display;

while the synchronous user interface thread is blocked, displaying an asynchronous user interface display over the synchronous user interface display;

detecting completion of processing, by the synchronous program, corresponding to the synchronous user interface display;

in response to detecting completion of the processing corresponding to the synchronous user interface display:
    removing display of the asynchronous user interface display; and
    unblocking the synchronous user interface thread.

20. The computer readable storage medium of claim 19 wherein detecting that an asynchronous user interface display is to be displayed over the synchronous user interface display, comprises:

detecting a type of processing corresponding to the synchronous user interface display; and generating the asynchronous user interface display based on the type of processing detected.

* * * * *